United States Patent [19]
Schwarz

[11] 3,838,913
[45] Oct. 1, 1974

[54] GLARE SHIELD

[76] Inventor: Karl H. Schwarz, 6034 Windsor Dr., Shawnee Mission, Kans. 66205

[22] Filed: Oct. 24, 1972

[21] Appl. No.: 299,794

[52] U.S. Cl. ............... 351/47, 351/49, 351/58, 351/59
[51] Int. Cl. ........ G02c 9/04, G02c 7/12, G02c 7/02
[58] Field of Search .............. 351/47, 49, 57, 58, 59

[56] References Cited
UNITED STATES PATENTS

| | | | |
|---|---|---|---|
| 2,380,481 | 7/1945 | Tillyer et al. | 351/49 |
| 2,545,673 | 3/1951 | Pozarik | 351/59 |
| 2,714,717 | 8/1955 | Allman | 351/47 X |
| 2,773,422 | 12/1956 | Flynn, Sr. et al. | 351/49 |
| 2,789,462 | 4/1957 | Forgrave | 351/49 |

FOREIGN PATENTS OR APPLICATIONS

| | | | |
|---|---|---|---|
| 584,120 | 10/1958 | Italy | 351/49 |
| 619,006 | 3/1949 | Great Britain | 351/49 |

*Primary Examiner*—Paul A. Sacher
*Attorney, Agent, or Firm*—Fishburn, Gold & Litman

[57] ABSTRACT

A glare shield for night driving that includes light polarizing segments rotatably mounted on one another and mounted on the glasses to reduce entering light in varying and controlled amounts dependent on the amount of relative rotative orientation of respective light polarizing setments. The polarizing segments are mounted on the eyeglasses such that they are horizontally and vertically adjustable relative to each eye to allow the user to choose or define the desired area of his total peripheral vision for which he desires to control the amount of entering light.

1 Claim, 6 Drawing Figures

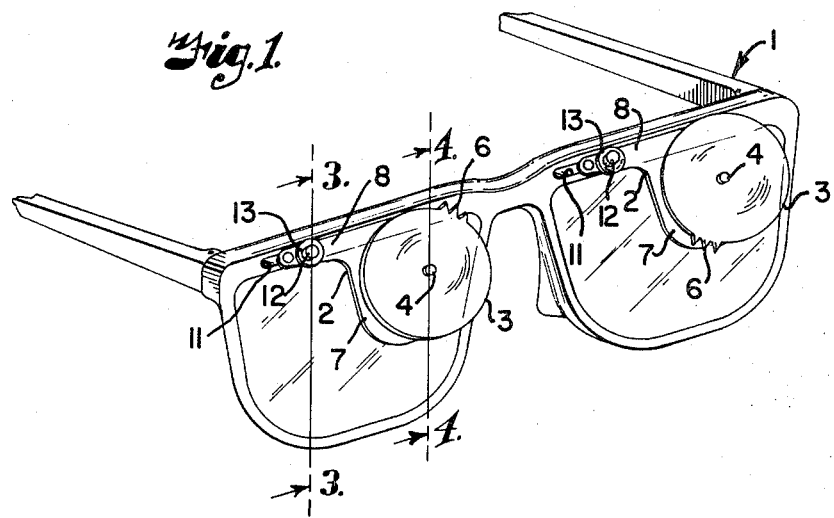
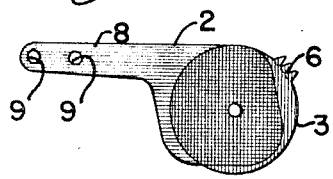
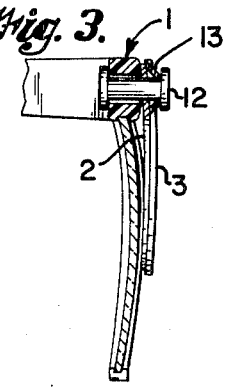
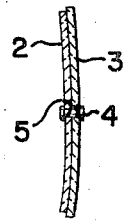
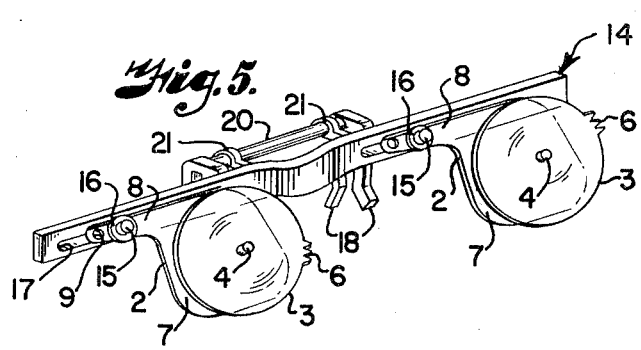
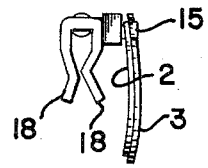

GLARE SHIELD

The intensity of light entering the eye influences the degree of contraction of the pupil. This is particularly noticeable when driving at night and facing the headlights of approaching automobiles. The light from the headlights causes the pupils to contract thereby reducing the driver's ability to see into the more darkened areas along the roadway. The limitation of vision within the total peripheral area of sight particularly affects the driver's vision in the critical area in front and to the right of the driver's path. This partial and temporary blinding is dangerous and results in collisions, hitting obstacles or running off the roadway. Proposed corrections for this blinding effect by automatic dinners, headlight lens and other devices have not been successful. This dangerous and blinding effect thereby still exists and will continue with the attendant dangers therefrom.

The principal objects of the present invention are: to provide glare shields for use when driving at night that have overlying polarized segments adjacent to the user's eyes for reducing the intensity of light entering a defined area of peripheral vision; to provide such shields wherein the polarized segments overlying portions are relatively rotatable so as to control the light intensity that reaches the eye from a defined area of peripheral vision; to provide such a shield wherein the polarized segments are supported to be between the user's eyes and an approaching light source to adequately block same while permitting normal vision around said segments into other areas such as road shoulders and the like; to provide such shields with means for attaching same to spectacles; to provide such shields with means so that they are both vertically and horizontally adjustable to allow the user to define the peripheral vision area of reduced entering light; to provide such shields wherein the polarized segments are affixed to the spectacles; to provide a clip-on framework that is adapted to be removably attached to a person's regular spectacles and have the polarized segments attached thereto so the polarized segments may be removed when not needed; to provide such a clip-on framework that has a portion adapted to pivot so that the attached polarized segments can be moved to a position out of the peripheral area of vision when not needed; to provide such shields that are easy to operate and increase the safety of night driving; and to provide such shields that are simple and inexpensive to manufacture, and sturdy in construction.

Other objects and advantages of this invention will become apparent from the following description taken in connection with the accompanying drawings wherein are set forth by way of illustration and example certain embodiments of the present invention.

FIG. 1 is a perspective view of spectacles with the assemblies of polarized segments attached thereto.

FIG. 2 is an enlarged view of an assembly of polarized segments.

FIG. 3 is an enlarged sectional view through the spectacles, a polarized segment and mounting means.

FIG. 4 is an enlarged sectional view through a glare shield showing details of the rotatable mounting means and polarized segments.

FIG. 5 is a perspective view of assembled polarized segments mounted on a clip operable for removable mounting on spectacles.

FIG. 6 is a side elevational view of the glare shields mounted on a clip adapted for removable mounting on spectacles.

Referring more in detail to the drawings:

As required, detailed embodiments of the invention are disclosed herein, however, it is to be understood that these embodiments are merely exemplary of the invention which may be embodied in many forms that are different from the illustrative embodiments presented herewith. Therefore, specific structural and functional details disclosed herein are not to be interpreted as limiting but merely as a basis for the claims actually defining the scope of this invention.

Support means have glare shield suitably mounted thereon and are operable for positioning the glare shields in front of a respective eye in such a manner that the glare shields are between the eyes and a bright light source. The glare shields are comprised of overlying transparent polarized segments that are relatively rotatable making the glare shields operable to vary and control the intensity of light transmitted therethrough to the respective eye. Controlling the intensity of light reaching the eyes reduces or eliminates the temporary blinding effect encountered by a person driving at night when facing the headlights of an approaching vehicle.

The reference numeral 1 designates generally support means or frame that in the illustrated structure is a spectacle frame of generally standard construction, that have mounted thereon, adjacent to each eye of the user, two polarized transparent segments with overlying portions. One polarized segment adjacent to each eye of the user is rotatable relative to its respective overlying polarized segment to control the amount of light passing therethrough. The assemblies of polarized segments are each supported by the support means that fit the user's head and are positioned before each of the user's eyes and are between the eyes and the lights of an oncoming vehicle for shielding the eyes from the glare of the lights.

A polarized segment or lens 2 that is transparent has a second polarized lens or segment 3 that is also transparent suitably rotatably mounted thereon. Preferably the segments 2 and 3 are made of a semi-rigid plastic material and are tinted. In the illustrated structure the segment 2 and the sgement 3 each have an aperture therethrough and have a suitable fastening device 4 such as a rivet securing same together whereby the segment 3 is rotable relative to the segment 2 and have overlying portions. Because the segments 2 and 3 are polarized, relative rotation thereof varies the amount of light that is transmitted therethrough. The segment 3 is preferably round and has the aperture 5 for the fastening device 4 centrally located. Offsetting the aperture and or having the segment 3 of a shape other than round would result in a change or shifting of overylying portions of the segments 2 and 3 as well as controlling the amount of light being transmitted therethrough upon relative rotation of the segments 2 and 3. In the illustrated structure, the segment 2 has a portion 7 extending outwardly of the segment 3 being positioned closer to the cneter of a respective eye of the user. When the segment 3 is tinted, the portion 5 provides a dimmed area in which the intensity of transmitted light is non-adjustable. The segment 3 is rotated about the fastening device 4 and is suitably held in the selected or desired position such as by friction between the segments 2 and 3 and the fastening device 4. To facilitate the rotation, each segment 3 is provided with a plurality of protuberances 6 such as V-shaped teeth extending from an edge portion thereof to provide a good grasping surface so that the segments 3 may be easily rotated by the use of the user's finger.

The segment 2 and its respective segment 3 are supported by the frame 1 to be between the user's eyes and an approaching light source such as vehicle headlights. The positioning is such as to block the light from the light source while still permitting the user to have vision into other areas such as the roadway ahead and the shoulders of the road. In the illustrated structure, of FIG. 1, each segment 2 and hence its respective segment 3 is suitably secured to the frame 1 preferably in such a manner as to be movable relative to the respective eye of the user. The movement relative to the user's eyes permits the user to define the area of his peripheral vision in which he desires to reduce the incoming light intensity. Preferably the segment 2 has an extending flange portion or arm 8 with one or more apertures 9 therethrough. The frame 1 has elongate slots of ways 11 therethrough preferably positioned above each lens. A suitable fastening device 12 such as a rivet or the like extends through an aperture 9 and a respective slot 11 for mounting each segment 2 and the respective segments 3 in position on the spectacle frame. In the illustrated structure, a resilient member 13 such as a disc or Belleville type spring washer or spring is mounted on each fastening device 12 and engages a respective segment 2 for applying force thereto providing for friction between the segment 2 and the frame 1. Each assembly of segments 2 and 3 can be moved horizontally by movement of the fastening device 12 in the respective slot 11 and vertically by pivoting some up or down to position same as desired by the user. The position of the lenses 2 and 3 is maintained by the friction between the segment 2 and the frame 1. The horizontal movement can be accomplished by moving the fastening device 12 along the groove 11 transversely relative to the user's eye and the vertical or up and down movement is made by pivoting the segment 2 about the fastening device 12. When used for driving the preferable position of each assembly of segments 2 and 3 is to the left side of the user's eyes to position same between the eye and the light of an oncoming vehicle as it approaches the driver on his left side. The light from the headlights thereof would enter the user's eyes from this position.

In operation, the segments 2 and 3 are mounted on spectacles by the method shown in FIG. 1 or in FIG. 5. The user of the spectacles adjusts the segments 2 and 3 horizontally and vertically to a position that he finds most desirable to reduce the light intensity from the headlights of an oncoming car to prevent the above described temporary blinding effect. He then rotates the segment 3 relative to the segment 2 so that the desired amount of light is excluded. After these adjustments are made the user need only wear his spectacles to prevent being blinded by the headlights of oncoming automobiles without impairing his vision ahead and to his right.

FIG. 5 illustrates a second or modified form of the present invention. It comprises a framework or frame member generally designated by the numeral 14 that can be removably mounted on existing spectacles requiring no modifications thereof. The framework 14 includes on each end thereof an assembly of segments 2 and 3 substantially the same as described above. Each assembly of the segments 2 and 3 is suitably mounted on the framework 14 similar to the method by which they were mounted on the frame 1, preferably, by having a fastening device 15 such as a rivet or bolt extend through an aperture 9 and a respective elongate slot or way 17 that is adjacent each end of the framework 14. A resilient member 16 similar to the resilient member 13 urges a segment 2 into engagement with the framework 14.

The framework 14 is provided with means that are adapted for removable mounting or clipping onto spectacles. In the illustrated structure of FIG. 5, the mounting means are resilient fingers 18 that fit over portions of the frame of spectacles holding the framework 14 in position thereon. The framework 14 is suitably secured to the resilient fingers 18 so that it will preferably swivel or pivot relative to the resilient fingers 18 permitting the user to move the segment assemblies upwardly out of his line or area of peripheral vision. As shown, a pin or shaft 20 is secured to and extends between the two sets of resilient fingers 18 and is mounted in apertures (not shown) that extend through mounting members 21 extending rearwardly from the framework 14. In the structure illustrated, the segments 2 and 3 are held in the up position by friction between the pin 20 and the inside surface of the apertures through the mounting members. It is to be noted that the framework 14 and the assemblies of segments 2 and 3 mounted thereon can be secured to the fingers 18 in such a manner that the framework 14 will not swivel. The fingers 18 permit the assemblies of segments 2 and 3 and the framework 14 to be removably mounted on the spectacles, when the assemblies of segments 2 and 3 are not needed they can be easily removed from the spectacles rather than swiveled out of the user's area of peripheral vision.

Operation of the modified form of the structure is similar to the operation of the form illustrated in FIG. 1 as previously described.

Many drivers do not wear prescription spectacles and it is to be noted that the structures illustrated in FIG. 1 and in FIG. 5 are suitable for use with non-prescription spectacles, or with a frame or other means suitable for being supported by portions of the user's body, such as his head or his ears and nose. This gives to a person who does not wear spectacles the same ability to control the intensity of light transmitted to his eyes from the headlights of oncoming cars as a person who wears prescription spectacles.

It is to be understood that while I have illustrated and described certain forms of my invention, it is not to be limited to the specific form or arrangement of parts herein described and shown.

I claim:

1. A glare shield for night driving comprising:
   a. a first tinted polarized transparent segment for each eye of a user and having a first portion and a second portion extending laterally from said first portion to define an arm,
   b. second polarized transparent segments respectively overlying said first portions and being rotatably mounted thereon for selectively adjusting the amount of light transmitted through said first portions, c. a frame member, means mounting said first and second segments on said frame member by said arm, said mounting means including structure permitting independent pivotting for vertical adjustment of said segments with respect to said frame and independent sliding for lateral positioning with respect to said frame, said structure having friction producing means operably positioned with respect to said frame member and arm for retaining said segments in adjusted position, said segments both being located substantially on the same side of a vertical center line of each line of sight whereby said first and second segments are between said respective eye and lights of an approaching vehicle but a substantial portion of each line of sight is unblocked by said first and second segments, d. said first portions of said first segments being positioned closer to the center of the respective line of sight than said second segments whereby light is transmitted to the eye in a gradient from unblocked to first portion only blocked to second segment plus first portion blocked, as the eye moves toward said side.

* * * * *